Dec. 3, 1940.   E. A. DOYLE   2,223,720
PORTABLE HOLE CUTTING MACHINE
Filed Aug. 20, 1938   2 Sheets-Sheet 1

INVENTOR
EDMUND A. DOYLE
BY
ATTORNEY

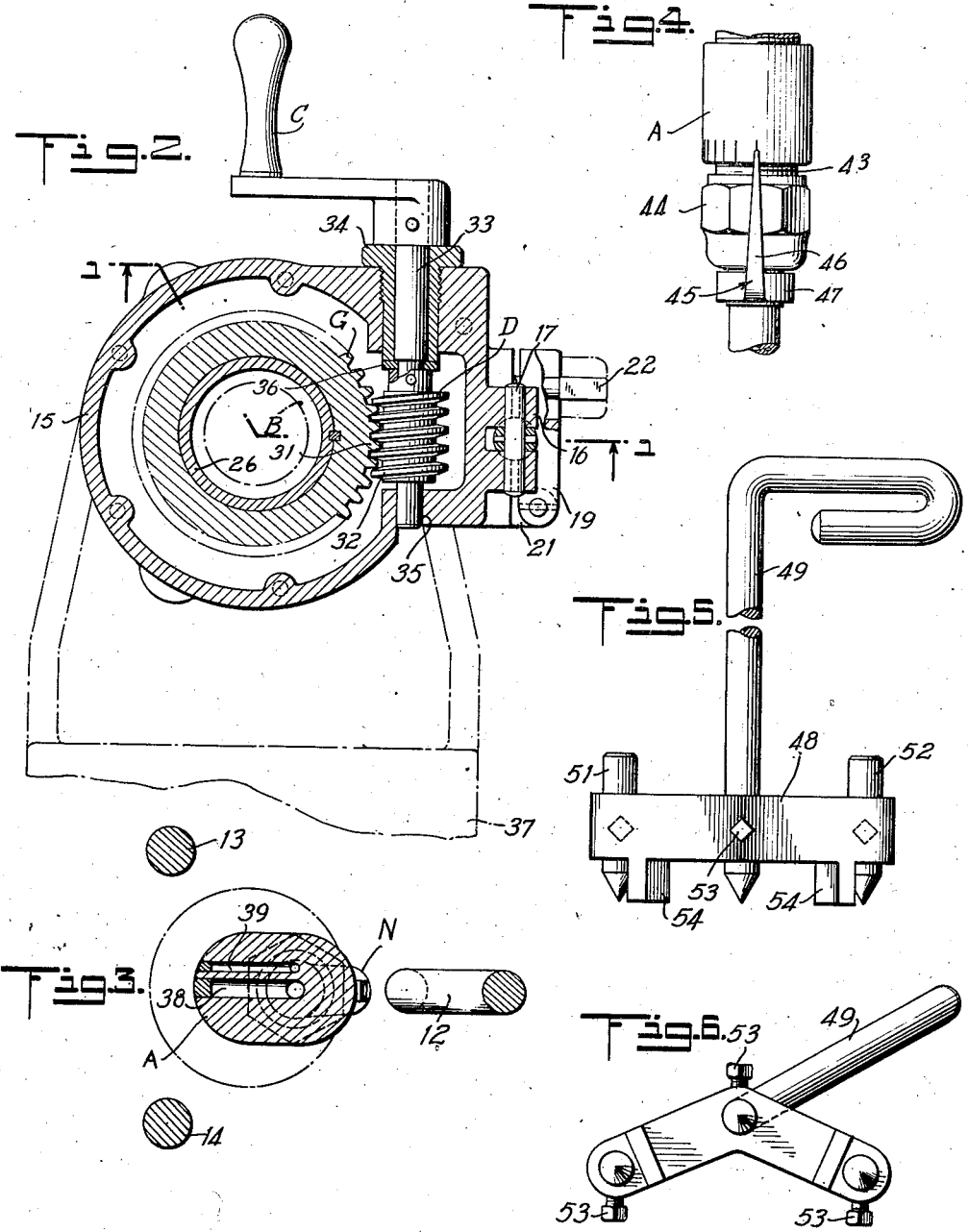

Patented Dec. 3, 1940

2,223,720

UNITED STATES PATENT OFFICE 2,223,720

PORTABLE HOLE CUTTING MACHINE

Edmund A. Doyle, Brooklyn, N. Y., assignor to Oxweld Acetylene Company, a corporation of West Virginia Application August 20, 1938, Serial No. 225,882

5 Claims. (Cl. 266—23)

This invention relates to blowpipe apparatus, and more particularly to apparatus for propelling a blowpipe nozzle or similar tool in a circular path over a steel plate or other workpiece.

The nozzle of a blowpipe often needs to be propelled steadily in a circular path and at uniform speed to perform various operations, for example, welding, local heat treating, flame-cutting, or related operations. Manually guided blowpipes have not proven to be successful wherever exacting requirements are to be met as the unsteadiness of the operator and the non-uniformity in the speed of movement detract materially from the quality of results obtainable.

Machines have been produced which are capable of propelling a blowpipe or other metallurgical tool about a circular path, but such machines are ordinarily of such large proportions or otherwise of such design as to preclude their use for reproducing small circles or where portability is desired. Small hand-operated circle-guiding mechanisms ordinarily incorporate many undesirable features, many of which have been overcome in the present device, as will hereinafter appear.

Accordingly, the principal objects of the present invention are to provide a portable machine of improved design for propelling a metallurgical tool or other instrument in a relatively small circular path; to provide in such a machine improved means for supporting the tool with respect to the work; to provide means for readily adjusting the radius of the circular path and for clearly indicating the radius to the operator; to provide means whereby a blowpipe or other metallurgical tool may be propelled manually at substantially uniform speed; to provide means for shifting a portion of the supporting means out of the operative position to permit the machine to be used in otherwise inaccessible locations; and to provide means for quickly and accurately locating the machine with respect to the work. These and other objects of the present invention will become more readily apparent from the following description in conjunction with the appended drawings, of which:

Fig. 2 is a cross-sectional view of the machine taken on the line 2—2 of Fig. 1;

Fig. 3 is a cross-sectional view taken on the line 3—3 of Fig. 1;

Fig. 4 is a detail elevational view of the nozzle connection and radius indicator, as seen from the line 4—4 of Fig. 1; and Figs. 5 and 6 are respectively side elevational and bottom views of a spotting or centering tool.

Figure 1:
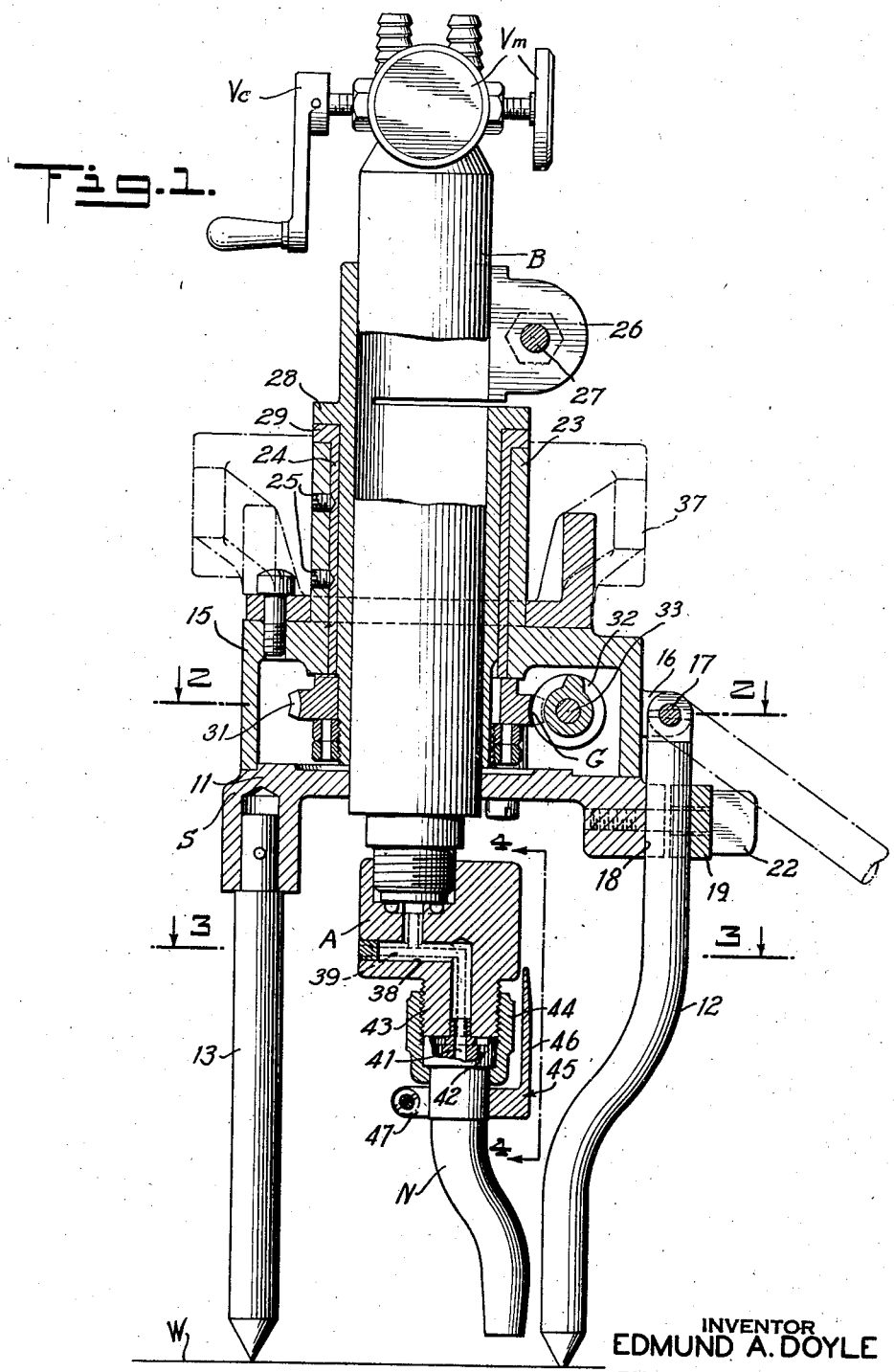
Fig. 1 is a longitudinal cross-sectional view through the improved machine taken on the line 1—1 of Fig. 2.

The machine comprises generally a support S preferably comprising a tripod, the legs of which contact with the surface of a steel plate or workpiece W at points outside of the desired circular path. A blowpipe B is mounted centrally within the support with its axis generally perpendicular to the surface of the workpiece. The blowpipe may be rotated by a manually operable drive mechanism D consisting of a crank C and reducing gear mechanism G. An offset adaptor A is secured to the delivery end of the blowpipe and comprises in effect a tubular radius arm for delivering the blowpipe gases to an eccentric or offset nozzle N at a point radially spaced from the axis of the blowpipe. Although the machine may be supplied with any sort of nozzle or other tool to perform the various functions of welding, heat-treating, and the like, the specific embodiment herein disclosed is provided with a flame-cutting nozzle capable of projecting preheating flames and an oxidizing jet against the work. Although the description is herein confined to a machine adapted for flame-cutting purposes, it will be understood that the machine may be readily adapted to perform other similar functions by providing the desired form of blowpipe and blowpipe nozzle or other tool.

Referring again to the drawings, and more particularly to Figs. 1, 2, and 3, the support S includes a top plate 11 from which legs 12, 13, and 14 depend. The respective legs terminate in pointed tips which rest directly upon the surface of the workpiece W. The leg 12 which is preferably provided with a blunt tip as indicated in Fig. 1, may be pivoted at its upper extremity or attached in any other manner so as to permit the leg to be removed or at least shifted out of the operating position to permit locating the machine in inaccessible locations. A housing 15 is secured in any convenient manner to the top plate 11, and comprises a generally cylindrical casing for protecting and supporting the blowpipe B and the associated blowpipe-rotating mechanism. The housing 15 is provided with a pivotal mounting means such as a projecting fork 16, with a pivot pin 17 extending along a generally horizontal axis between the respective arms thereof. The upper end of the leg 12 is pivotally mounted in the fork 16, thereby allowing the leg 12 to be swung in a vertical plane about the pin 17 as an axis. The leg 12 abuts against a shoulder 18 on the side of the plate 11, when the leg is in the downward or operating position and is held in abutting relation by any suitable form of lock, such as a bifurcated latch 19, pivoted to a projection 21 of the top plate 11 so that it may be swung outwardly in a generally horizontal plane. The latch may be held in the engaging position by a locking thumb screw 22 extending through the bifurcated end of the latch 19, the inner end of the screw being threaded into the top plate 11. In order to release the leg 12 from the operating position, permitting it to be swung to the position indicated in broken lines in Fig. 1, the locking thumb screw 22 is given a quarter turn from the locked position to the position indicated by broken lines in Fig. 2, at which time the latch 19 may be swung outwardly to release the leg 12.

The housing 15 is provided with a centrally located vertical sleeve 23, which sleeve is lined with a close fitting bushing 24 locked within the sleeve as by set screws 25. A blowpipe mounting clamp 26, consisting of a tubular member surrounding the blowpipe B, is provided with means at the upper end such as a clamping screw 27, for securing the clamp to the blowpipe. The depending tubular portion of the clamp 26 is slidably mounted within the bushing 24, and tightly engages the blowpipe B. The blowpipe and clamp rotate within the bushing 24 as a unit, the downward thrust being taken by a thrust collar 28 surrounding the upper end of the blowpipe clamp and engaging an annular flange 29 at the extremity of the bushing 24.

The blowpipe is swivelled about its axis within the support S by a manually operable drive mechanism D, best shown in Fig. 2. A worm wheel 31 is keyed or otherwise rigidly secured to the blowpipe clamp 26 so as to be free to rotate within the housing 15 in response to the rotary motion of the worm 32 with which the worm wheel meshes. A worm-driving rod 33 extends slidably through a bushing 34 and into the housing 15, connecting the operating crank C with the worm 32. The end of the rod 33 opposite the crank C is journaled with a recess 35 in the housing 15, and a washer 36 is located between the worm 32 and the bushing 34 to decrease friction.

As the crank C is rotated, the motion is imparted through the reducing gearing mechanism G to rotate or swivel the blowpipe B and clamp 26 as a unit. An appreciable reduction in speed is obtained through the use of the worm 32 and worm wheel 31 with the consequent advantage that the slight irregularities in the motion of the crank introduced by manual operation are not perceptible in the motion of the blowpipe. In the machine disclosed in the drawings approximately forty turns of the crank C are required to effect a single revolution of the blowpipe B. The high gear-ratio employed besides minimizing undesirable variations in speed also permits the use of light-weight parts of suitable strength. By locating the worm 32 so that it rotates about a horizontal axis when the machine rests upon a working surface, the crank C is rotated in a vertical plane by an operator normally positioned above the machine, and the strokes applied by the operator will consist principally of alternate downward and upward thrusts producing little or no tendency to move the machine sideways from its set position. A generally horizontal handle 37 may be secured to the top of the housing 15. The pressure applied to this handle by the operator further assists in securely positioning the machine upon the working surface and lessens the possibility of shifting during operation.

The adaptor A which is secured at the delivery end of the cutting blowpipe B in place of the usual cutting nozzle, comprises a tubular radius arm or conduit capable of delivering cutting oxygen and a combustible gas mixture to a specially designed nozzle N through passages parallel with, but offset from, the delivery passages of the cutting blowpipe. Staggered or offset passages 38 and 39 are employed to convey cutting oxygen and the gaseous combustible preheat mixture from the delivery end of the blowpipe to the respective inlet passages 41 and 42 of the nozzle N. The adaptor terminates at its lower extremity in a projection 43 which is threaded to receive the nozzle coupling 44. The projection 43 is radially spaced from the axis of the blowpipe, so that as the blowpipe is rotated, the projection 43 is propelled in an arcuate path, the radius $r$ being equal to the eccentricity, as indicated in Fig. 1.

The inlet or upper portion of the nozzle N is of standard design, but the central portion is deformed so that the lower or discharge portion is located in eccentric or offset relation to the upper portion. The degree of eccentricity of the nozzle may vary somewhat but preferably it is substantially equal to the distance $r$ corresponding to the radius of the projection 43. The eccentric or offset nozzle N is swivelly mounted to the projection 43 so that the effective radius of the delivery or discharge portion of the nozzle from the axis of the blowpipe may be adjusted by turning the nozzle N in its own mounting after which the coupling 44 may be tightened to preclude gas leakage.

By forming the nozzle N so that the degree of eccentricity with respect to its own swivel mounting is equal to the radius $r$ of the projection 43 from the axis of the blowpipe B, the effective radius of the jet discharged from the nozzle may be varied from zero to twice the distance $r$. For example, assuming a radius $r$ of the projection 43 equal to one inch and an eccentricity in the nozzle N also equal to one inch, the effective radius of the cutting nozzle N may be varied from zero to two inches, according to whether the nozzle eccentricity subtracts from, or adds to, the radius $r$ of the projection 43. In Figs. 1 and 3, the nozzle is shown swivelled to the position providing the maximum cutting radius.

The machine is provided with a radius indicator 45 comprising a pointer 46 secured to the shank of the upper portion of the nozzle N. As shown in Fig. 1, this is conveniently accomplished by forming the pointer 46 integral with a clamp 47 extending about the nozzle N. The pointer 46 extends upwardly to suitable indicia inscribed about the outer surface of the adaptor A as shown in Fig. 4, which surface is substantially cylindrical and concentric with the axis about which the nozzle N swivels. The marks on the adaptor A designate the dimension of the circular path followed by the nozzle N, expressed, for example, in terms of either the radius or the diameter. Accordingly, where it is desired to project a stream of cutting gas in a circular path of known dimensions, the nozzle N is swivelled with respect to the projection 43 until the pointer 46 indicates the desired dimension, after which the nozzle may be secured by tightening the coupling 44.

When the preliminary adjustment as to radius size has been made, the machine is placed upon the surface of a workpiece W, as indicated in Fig. 1, with the nozzle N approximately over the course to be followed. The proportions of the gas mixture are next adjusted by means of valves Vm and the preheating jets ignited to heat the starting point of the cut. When the locally heated zone reaches the ignition temperature, the operator may slowly open the cutting oxygen valve Vc to start the cut while at the same time starting rotational movement of the blowpipe and the nozzle N by turning the crank C.

Whenever possible, the oxidizing cut should be started at an edge of the workpiece or the jet should be projected initially through a starting hole formed, for example, by a drilling operation in order to minimize the formation of craters in the surface of the metal at the starting point. When it is desired to form a cut adjacent to a vertically extending flange or other similar projection and it is impossible to properly locate the machine with all of the supporting legs in the downwardly extending position, the machine may be properly located by unlocking the latch 19 and lifting the leg 12 clear of the obstruction so that the machine may be moved closer. The machine then rests on but two legs which take most of the weight, but the operator may maintain it in an upright position by grasping the handle 37.

Although the machine may be positioned fairly accurately by locating the nozzle directly over a path of travel marked out on the surface of the workpiece, more accurate results may be obtained through the use of a spotting tool or templet, for example, of the type shown in Figs. 5 and 6. The tool disclosed in the drawings comprises a frame 48 provided with three vertically extending openings corresponding in position with the axis of the blowpipe and the tips of the legs 13 and 14, which openings slidably receive a centering pin 49 and two locating pins 51 and 52 respectively. The pins are properly aligned vertically within the frame 48 and are securely held, as by means of set screws 53. A pair of stops 54 projecting downwardly from the frame 48 to a point slightly above the sharpened tips of the pins 49, 51, and 52 serve to keep the indentations or spotting holes of uniform size.

The center of the circular path is first located by means of a center punch, after which the spotting tool is placed in position with the center pin 49 engaging the center mark. The pins 51 and 52 are properly located on the workpiece and are individually struck as by means of a hammer to form separate indentations in the work surface. The hole-cutting machine is then placed in position with the points of the legs 13 and 14 engaging the marks formed by the pins 51 and 52, at which time the axis of the blowpipe and the center of the circular path correspond with the position previously occupied by the centering pin 49.

When the hole is not started adjacent to an edge and no starting hole is provided, the initial cut must be projected through the metal by the oxidizing jet itself. Under ordinary circumstances, no real difficulty is encountered in thus starting the cut, if the flow of cutting oxygen is turned on gradually. More perfect results may be obtained by first staggering the machine from the locating marks. For example, the machine may be initially shifted sufficiently to move the cutting jet about one-quarter inch, either inside or outside the line of travel depending on whether it is desired to form an opening in the workpiece or to cut out a disc. After the starting cut has thus been formed off the line of travel, the machine is manually pivoted slowly about one leg toward the predetermined position until the second leg engages its locating mark, at which time the crank is turned in the usual manner to propel the nozzle N about its circular path.

Various modifications of the present invention may be made without departing from the scope of the invention or sacrificing its advantages.

I claim:

1. Apparatus for propelling a blowpipe nozzle in a circular path relatively to a workpiece, comprising a radius arm spaced above said workpiece; means for rotating said arm about the axis of said circular path; a nozzle projecting downwardly from substantially the extremity of said arm toward said workpiece, said nozzle being free to swivel beneath said arm about an axis offset from the discharge end of said nozzle to adjust the radius of said circular path, said arm terminating in a cylindrical surface concentric with the axis about which said nozzle swivels; and cooperating indicia means on said nozzle and said arm comprising a scale on said cylindrical portion and a pointer on said nozzle extending toward said scale for indicating the position of said nozzle relative to said arm and accordingly the distance of said discharge end of said nozzle from said axis of said circular path.

2. Apparatus for propelling a blowpipe nozzle in circular paths relatively to a workpiece, comprising a radius arm spaced above said workpiece; means for rotating said arm about the axis of said circular path; an offset nozzle projecting downwardly from substantially the extremity of said arm toward said workpiece, said nozzle being free to swivel relatively to said arm to vary the radius of said circular path; and means indicating the position of said nozzle relative to said arm to denote the radius of said circular path, said means comprising a scale on said arm, and a pointer attached to said nozzle and extending upwardly toward said arm.

3. An apparatus for propelling a blowpipe nozzle in a circular path over a workpiece, comprising a tripod support having legs extending upwardly from points on said workpiece spaced outside of said circular path for supporting said apparatus, one of said legs being pivoted about a horizontal axis, whereby such pivoted leg may be shifted out of its supporting position; means for locking said pivoted leg in its supporting position; and a blowpipe nozzle rotatably connected to said support so as to project a gaseous jet against said workpiece.

4. In apparatus for rotating a blowpipe having an eccentrically disposed nozzle adapted to move about a circular path upon the surface of a workpiece, the combination comprising supporting means adapted to rest on said workpiece and to extend upwardly therefrom; blowpipe mounting means rotatably secured to said supporting means comprising a tubular mount on said supporting means, a tubular blowpipe clamp journalled within said mount and adapted to engage the blowpipe body for swiveling motion relative to said supporting means, said clamp being provided with a thrust collar engaging said tubular mount; and propelling means for rotating said clamp within said mount.

5. Apparatus for propelling a blowpipe nozzle in a circular path relative to a workpiece, comprising a radius arm spaced above said workpiece; means for rotating said arm about the axis of said circular path; a nozzle projecting downwardly from substantially the extremity of said arm toward said workpiece, said nozzle being free to swivel beneath said arm about an axis offset from the discharge end of said nozzle to adjust the radius of said circular path; and cooperating indicia means on said nozzle and said arm for indicating the position of said nozzle relative to said arm and accordingly the distance of the discharge end of said nozzle from said axis of said circular path.

EDMUND A. DOYLE.